(12) United States Patent
Bates et al.

(10) Patent No.: US 6,934,940 B2
(45) Date of Patent: Aug. 23, 2005

(54) SOURCE CODE TRANSFORMATION-TEMPORARY OBJECT REDUCTION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 10/060,178

(22) Filed: Jan. 30, 2002

(65) Prior Publication Data

US 2003/0145312 A1 Jul. 31, 2003

(51) Int. Cl.[7] .............................................. G06F 9/45
(52) U.S. Cl. ...................... 717/152; 717/143; 717/159
(58) Field of Search .............................. 717/143, 159, 717/152, 151

(56) References Cited

U.S. PATENT DOCUMENTS

| | | | | | |
|---|---|---|---|---|---|
| 5,898,875 | A | * | 4/1999 | Nakamura et al. | 717/165 |
| 6,292,940 | B1 | * | 9/2001 | Sato | 717/157 |
| 6,317,816 | B1 | * | 11/2001 | Loen | 711/171 |
| 6,330,659 | B1 | * | 12/2001 | Poff et al. | 712/34 |
| 6,523,168 | B1 | * | 2/2003 | Arnold et al. | 717/116 |
| 6,715,148 | B1 | * | 3/2004 | Endicott et al. | 719/316 |
| 2003/0066052 | A1 | * | 4/2003 | McGeorge, Jr. | 717/124 |

OTHER PUBLICATIONS

Chen, FG; Hou, Tin–Wei; "Design, and Implementation of a Java Execution Environment", pp. 686–692, Dec 1998, International Conference on Parallel and Distributed Systems, retrieved from IEEE Nov. 23, 2004.*

Chen, William Y; Chung Pohua P; Conte, Thomas M; "The Effect of Code Expanding Optimizations on Instruction Cache Design", pp. 1045–1057, 1993 IEEE, retrieved Nov. 23, 2004.*

Cowlishaw, Mike; "NetRexx—an alternative for writing Java classes", pp. 200–205, 1997 IEEE retrieved Nov. 23, 2004.*

Hutcherson, Reggie; "StringBuffer versus String What is the performance impact of the StringBuffer and String Calsses?", retrieved from google.com search: www.java-world.com on Nov. 23, 2004.*

* cited by examiner

*Primary Examiner*—Wei Y. Zhen
*Assistant Examiner*—Mary Steelman
(74) *Attorney, Agent, or Firm*—Moser, Patterson & Sheridan, LLP

(57) ABSTRACT

Embodiments of the invention generally provide a method, article of manufacture, and apparatus for code transformation. In one embodiment, the invention provides a method of transforming source code. The method determines if a source code statement includes a first operation that receives input from a result of a second operation, where the second operation acts on a plurality of arguments. If the source code includes the first operation, then the method transforms the source code into a plurality of statements that include the first operation acting on one of the arguments.

15 Claims, 4 Drawing Sheets

SOURCE CODE TRANSFORMATION-TEMPORARY OBJECT REDUCTION

BACKGROUND OF THE INVENTION

1. Field of the Invention

The invention relates to computers and computer software. More particularly, the invention relates to a method and apparatus for compiler-optimized code.

2. Description of the Related Art

Generally, programmers and computer users use a program editor to write computer programs and develop software applications in the form of source code. The source code is conventionally written in a high-level programming language, e.g., C++, Java®, Pascal, and the like. To run such computer programs in a computer system, a compiler program must convert the source code into executable code or object code.

Unfortunately, one of the most common contributions to writing inefficient programs is the generation of temporary objects. In one case, while writing programs such as servlets, programmers may use a StringBuffer variable to output HTML to a client device. For example, consider the following concatenated source code statement:

string.append(stvar_a+"AND"+stvar_b)

While this programming statement provides a correct source code statement to a compiler, the compiled code when executed creates temporary objects used to complete the concatenation process. For example, if stvar_a contained the object "THIS" and stvar_b contained the object "THAT", the compiled code when executed would produce a first temporary object "THIS AND", and then create a second temporary object "THIS AND THAT", which is then appended to the object "string". As temporary objects require the processor to store the result of each object for later access during code execution, executing temporary objects leads to an increased processor run-time that may severely affect the program efficiency and may degrade the performance of the program. Therefore, a need exists for a method and apparatus to increase the run-time efficiency of the compiled source code.

SUMMARY OF THE INVENTION

The invention generally provides a method, article of manufacture, and apparatus for code transformation. In one embodiment, the invention provides a method of transforming source code. The method determines if a source code statement includes a first operation that receives input from a result of a second operation, where the second operation acts on a plurality of arguments. If the source code includes the first operation, then the method transforms the source code into a plurality of statements that include the first operation acting on one of the arguments.

In another embodiment, the invention provides a method of transforming source code, The method parses a source code statement. The method then determines if the source code statement includes a first operation that receives as an input a result of a second operation, where the second operation acts on a plurality of arguments. If the source code includes the first operation, then the method determines the order of the arguments, and then transforms the source code statement into a plurality of statements containing the first operation acting on one of the arguments.

In another embodiment, the invention provides a computer readable medium storing a software program that, when executed by a processor of a computer, causes the computer to perform an operation for transforming source code. The operation may be implemented as any of the methods described above, for example.

BRIEF DESCRIPTION OF THE DRAWINGS

So that the manner in which the above recited embodiments of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention are directed to providing a method, article of manufacture, and apparatus for code transformation. One embodiment of the invention is implemented as a program product for use with a computer system such as, for example, the computer system of FIG. 1 and described below. The program(s) of the program product defines functions of the embodiments (including the methods described below with reference to FIGS. 2, 3 and the flow chart of FIG. 4) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

While the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. In general, the routines executed to implement the embodiments of the invention, may be implemented as part of an operating system or a specific application, component, program, module, object, or sequence of instructions. The inventive computer code typically is comprised of a multitude of instructions that will be translated by the native computer into a machine-readable format and hence executable instructions. Also, the programs may be comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
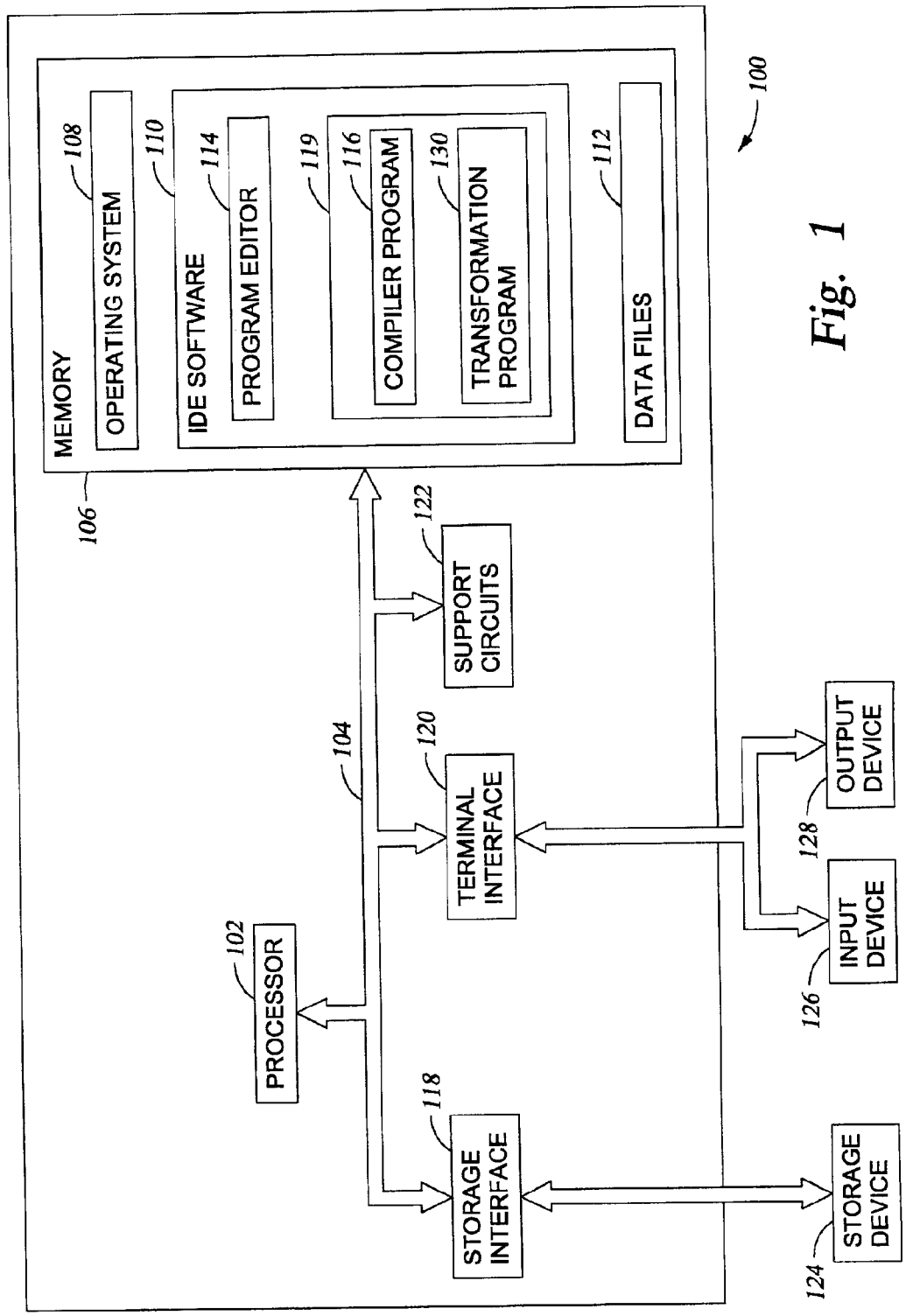
FIG. 1 depicts a block diagram of one embodiment of a computer system utilized in the invention.

FIG. 1 depicts one embodiment of a computer system 100 illustratively utilized in accordance with the invention. The computer system 100 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. Illustratively, the computer system 100 comprises a standalone device. However, the computer system 100 may also comprise a device coupled to a computer network system. In one embodiment, the computer system 100 is an eServer iSeries 400 available from International Business Machines of Armonk, N.Y.

The computer system 100 is generally coupled to a number of peripheral devices. Illustratively, the computer system 100 is coupled to a storage device 124, input devices 126, and output devices 128. Each of the peripheral devices is operably coupled to the computer system via respective interfaces. For example, the computer system 100 is coupled to the storage device 124 via a storage interface 118, and is coupled to the input device 126 and the output device 128 via a terminal interface 120.

The support circuits 122 include devices that support the operation of the computer system 100. Examples of support circuits 122 include a power supply, a clock, and the like. The storage device 124 may comprise either a permanent or removable direct access storage device (DASD). The input devices 126 may comprise any device utilized to provide input to the computer system 100. Examples of input devices 126 include a keyboard, a keypad, a light pen, a touch screen, a button, a mouse, a track ball, a speech recognition unit, and the like. The output devices 128 may comprise any conventional display screen. Although shown separately from the input devices 126, the output devices 128 and input devices 126 could be combined. For example, a display screen with an integrated touch screen, and a display with an integrated keyboard, or a speech recognition unit combined with a text speech converter could be used.

The computer system 100 is shown in a programming environment having at least one processor 102, which obtains instructions and data from a main memory 106 via a bus 104. In one embodiment, the main memory 106 includes an operating system 108 and Integrated Development Environment (IDE) software 110. In addition, the main memory 106 may contain various files 112 used with the IDE software 110. The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The operating system 108 is the software used for managing the operation of the computer system 100. Examples of the operating system 108 include IBM OS/400®, UNIX, Microsoft Windows®, and the like. The IDE software 110 includes a combination of different programs that enable a programmer to develop computer programs and other software. The files 112 include any file used or created while executing the IDE software 110. Examples of the files 112 include source code, object code, bytecodes, and the like.

In one embodiment, the IDE software 110 may include a program editor 114, a compiler program 116, and a code transformation program 130. In another embodiment, the IDE software includes an interpreter in addition to, or instead of, the compiler program 116. The program editor 114 is a software application that enables a programmer to write and edit computer programs in the form of source code. The source code is written in a high level programming language, e.g., C++, Pascal, Java®, and the like.

Different types of compiler programs 116 include a traditional "static" compiler, a Java® compiler, or a Just-In-Time (JIT) compiler. The static or traditional compiler converts source code into executable object code. The Java® compiler converts source code into bytecode. A program known as a "virtual machine" then processes the bytecode. The virtual machine comprises an interpreter to execute instructions in the bytecode and a JIT compiler to compile the bytecode. As such, the bytecode is executed by either the interpreter or compiled by the JIT compiler.

While the code transformation program 130 is shown integral to the IDE software 110, the code transformation program 130 may also be a stand-alone program. In another embodiment, the code transformation program 130 may be integrated with the program editor 114. For example, the program editor 114 may have the code transformation program 130 integrated into the output side (e.g., backend) of the program editor 114 to facilitate the code transformation function. In addition, the program editor 114 may be adapted with a transformation selection function to allow the programmer to select or deselect the code transformation program 130.

Figure 2A:
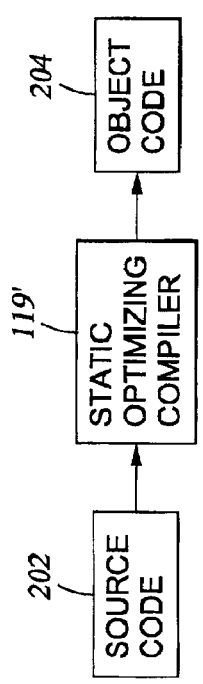
FIG. 2A depicts a conversion of source code to object code by a compiler program.
Figure 2B:
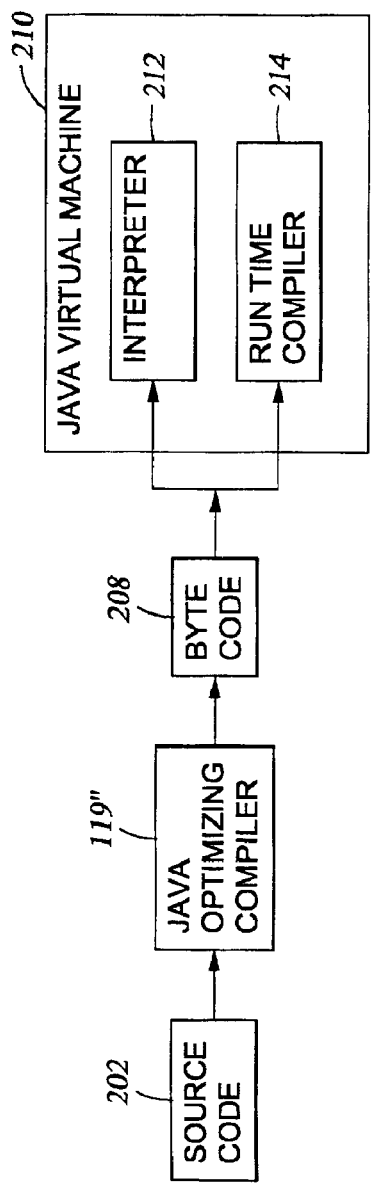
FIG. 2B depicts a conversion of source code to bytecode in a Java® programming environment.

In one embodiment, the compiler program 116 is combined with the code transformation program 130 to form an optimizing compiler program 119 used to receive source code statements from the program editor 114 and perform at least one source code transformation. The optimizing compiler program 119 is adapted to compile the transformed source code into object code or bytecode. FIGS. 2A and 2B depict different compilation processes of source code into executable code (i.e., object code or bytecode) using the optimizing compiler program 119. FIG. 2A depicts a conversion of source code 202 using a static optimizing compiler program 119'. The source code 202 comprises one or more programs or files 112 that is generally written in a programming language such as C, C++, Pascal, Java®, and the like. The static optimizing compiler program 119' is a software program that interprets, transforms, and converts the source code 202 into object code 204. The object code 204 comprises one or more programs or files used by the operating system 108 or an application program (not shown).

FIG. 2B depicts a conversion of source code 202 in a Java® programming environment. In one embodiment, the Java® programming environment uses an optimizing Java compiler program 119" to transform source code 202 and create bytecode 208. The bytecode 208 represents a type of source code 202 that may be processed by a Java® virtual machine program 210 comprising an interpreter 212 and a run time compiler program 214, e.g., a Just In Time (JIT) compiler. Specifically, the bytecode 208 is executed by the interpreter 212 or compiled by the run time compiler 214. In contrast to the source code 202, the bytecode 208 is usable in multiple platforms, i.e., operating system 108 and processor 102 combinations. The interpreter 212 interprets or maps generalized machine instructions in the bytecode 208 into instructions specific to the processor 102. The run-time compiler 214 compiles the bytecode 208 into executable object code 204 for a specific platform.

Figure 2C:
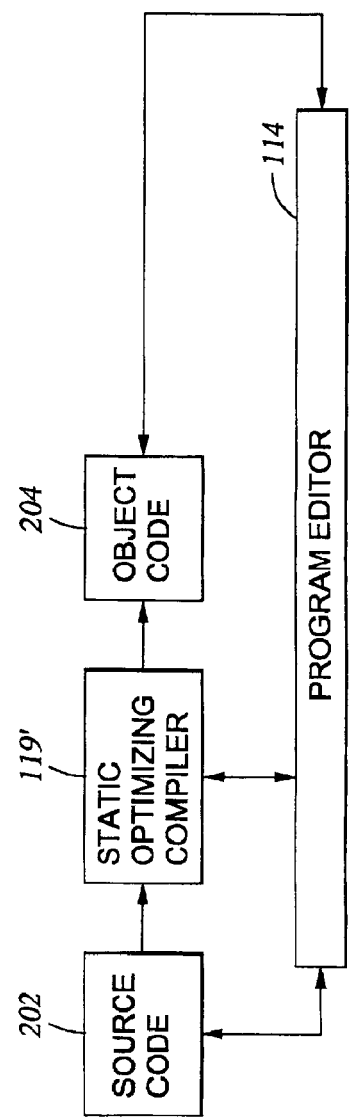
FIG. 2C depicts components of Integrated Development Environment (IDE) software used for optimizing compiler operations.

FIG. 2C depicts one embodiment of the Integrated Development Environment (IDE) software 110 used for developing source code. Illustratively, in one embodiment the IDE software 110 comprises the program editor 114 and the optimizing compiler program 119. The optimizing compiler program 119 transforms the source code 202 in accordance to the concatenation operator (e.g., "+") and object type such as string, integer, and the like, being invoked. During software development, the editing of the source code 202, the compilation process of the optimizing compiler program 119', and object code may be interactive with the program editor 114 to allow the programmer to more easily develop and debug the source code. In particular, the IDE software 110 shown in FIG. 2C models the environment shown in FIG. 2A, in which, the compiler 116 is a static compiler program 119' configured to receive source code 202 and produce object code 204. However, any compiler/interpreter environment is contemplated, such as for example, the Java® programming environment of FIG. 2B. While aspects of the invention pertain to the Java® programming environment, the transformation process is contemplated to pertain to other types of programming environments such as basic, Pascal, or object-oriented environments such as C++.

While in one embodiment the code transformation program 130 transforms the source code into the intermediate code, alternatively a compiler that is adapted to analyze bytecodes such as the optimizing Java® compiler 119" may incorporate the code transformation program 130 to optimize compilation operations such as copy propagation. For example, the code transformation program 130 could be used to allow operations like copy propagation to move string expressions to the append method even if the string expressions are located several code lines ahead of the append method.

Figure 3:
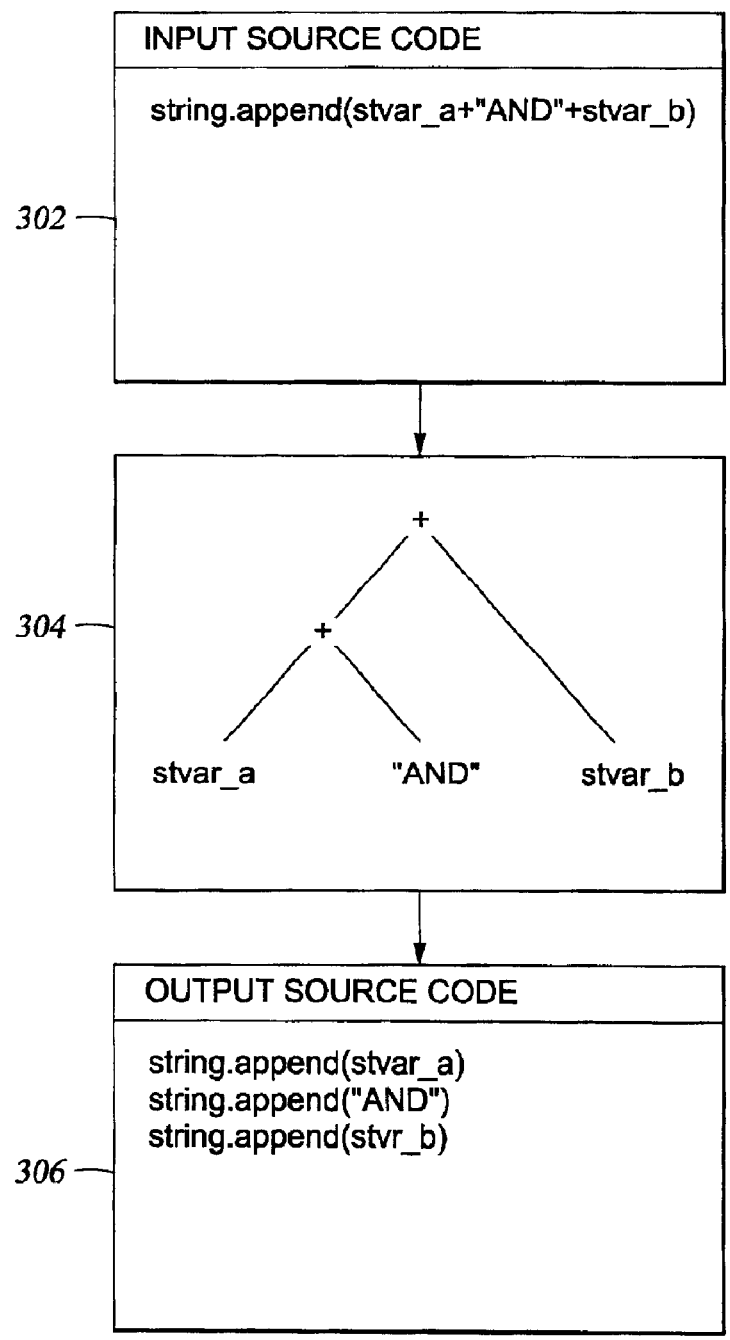
FIG. 3 depicts one example of a source code transformation process.
Figure 4:
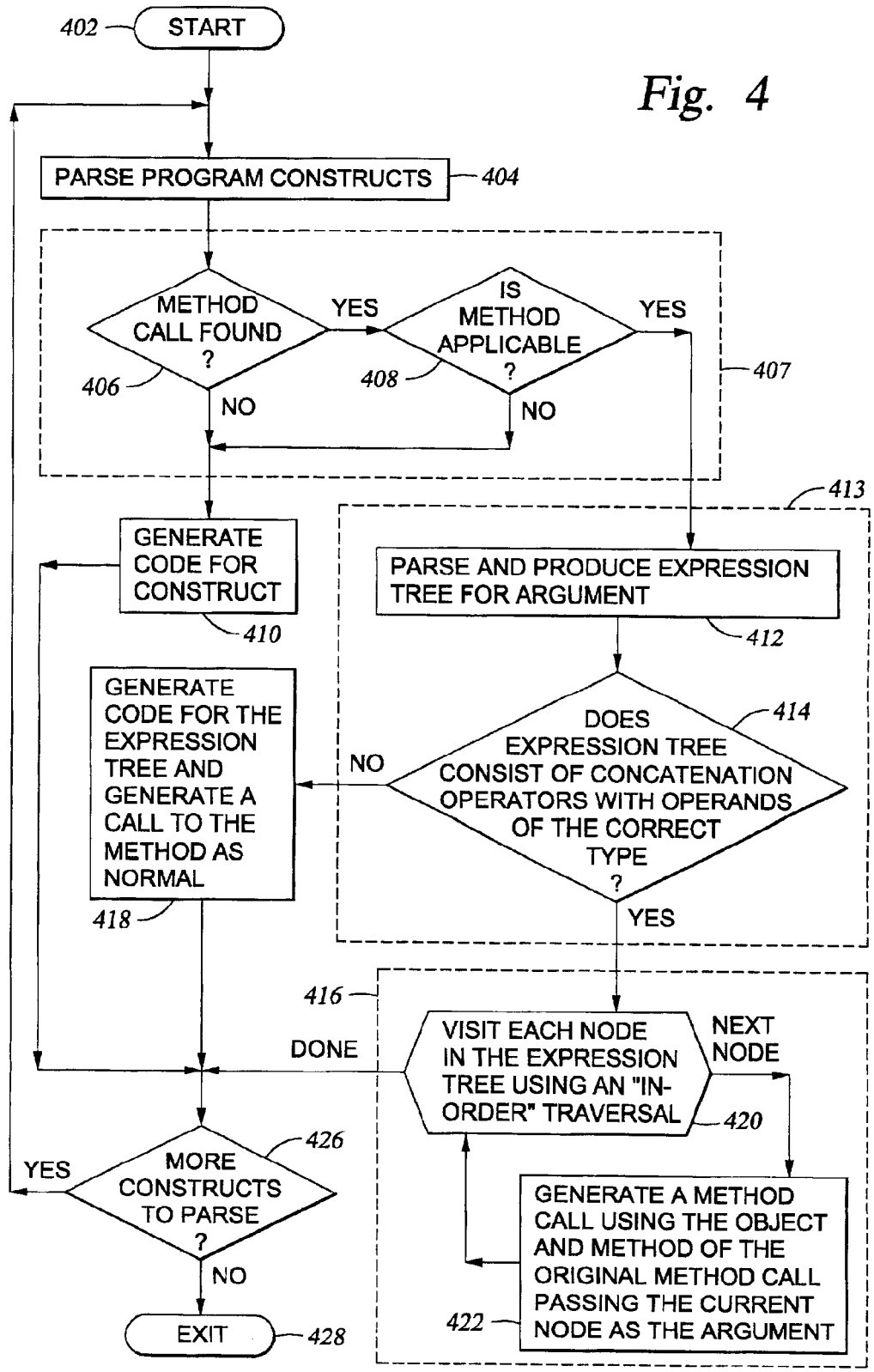
FIG. 4 depicts a flow diagram for one embodiment of a code transformation program.

FIG. 3 and FIG. 4 depict one embodiment of a source code transformation process. FIG. 3 illustrates one example of the method 400 of FIG. 4. FIG. 4 depicts a flow diagram of the method 400 of the code transformation program 130 for transforming code (e.g., concatenated source code 302) into compiler optimized source code (e.g., transformed source code 306). Specifically, the method 400 starts at step 402 when a compilation process is for example initiated by the optimizing compiler program 119. The method 400 proceeds to step 404 where the transformation program 130 is initiated to parse the program constructs of one or more source code statements. At step 407, the method 400 determines the identity of source code (e.g., a method call) that performs a first operation. If the source code does not contain a first operation then the method 400 proceeds to step 410 to generate code using the parsed program constructs and then proceeds to step 426, described below. If the source code includes code that performs a first operation then the method 400 proceeds to step 413 described below.

In one embodiment, step 407 includes a step 406 and 408 to determine the identity of the source code operation that performs a first operation. At step 408, the method 400 determines if a method call operation is part of the parsed program constructs. If a method call operation is not found, the method 400 proceeds to step 410. If a method call operation is found, the method 400 then proceeds to step 408. At step 408, the method 400 determines if the method call type is applicable. In one embodiment, a method call type is applicable if the variable type corresponds to the object type. For example, if the method call was appending the object type string having a plurality of concatenated string arguments then the method 400 proceeds to step 413. The method 400 may determine if the method call is applicable using any number of techniques. For example, the method call may be flagged as applicable by the programmer, be determined to be applicable by the method 400, or may be hard coded as the applicable type of method call into the code transformation program 130. In one embodiment, the method 400 may flag the method call not applicable if the variable type does not match the object type. For example, an integer variable generally does not correspond to append method call of type string and therefore may not be applicable, even though the integer usually will be converted to a string and appended to the object. If the method call was not applicable, then the method 400 proceeds to step 410. If the method call is applicable then the method 400 proceeds to step 413. At step 413, the method 400 determines if the source code includes a second operation that would provide a result to the first operation. If the source code does not include a second operation that provides a result to the first operation then the method 400 proceeds to step 418 described below. If the source code does include a second operation that provides a result to the first operation then the method 400 proceeds to step 416 described below.

In one embodiment, step 413 includes a step 412 and 414 to determine a second operation. At step 412, the method 400 produces an expression tree of concatenated source code having the concatenation operators as the nodes of the expression tree. In one case, at step 412 the method 400 processes an input concatenated source code 302 as illustrated in FIG. 3 string.append(stvar_a+"AND"+stvar_b)

into an expression tree 304 having the "+" concatenation operators as the nodes between arguments stvar_a, "AND", and stvar_b. At step 414, the method 400 determines if the concatenation operators contain the applicable type of concatenation operator (e.g., +), and/or at least one concatenation operator. If the concatenation operators are not the applicable type, the method 400 proceeds to step 418. The method 400 may determine if the concatenation operators are applicable using any number of techniques. In one aspect, the concatenation operators may be flagged as applicable by the programmer, be determined to be applicable by the method 400, or may be hard coded as the correct type into the code transformation program 130. At step 418, the method 400 generates code from the expression tree and generates a method call. The method 400 then proceeds to step 426 described below. If the concatenation operators are of the applicable type then the method 400 proceeds to step 416.

At step 416 the first operation and arguments of the second operation are transformed into individual source code statements each having the first operation acting on one of the arguments. In one embodiment, the step 416 includes a step 420 and a step 422 to transform code. At step 420, the method 400 processes each node of an expression tree in an "in-order" traversal to process the arguments in a correct order. At each node, the method 400 proceeds to step 422 to generate a method call using the object and method of the original source code and then passes each argument attached to current node as the argument within the individual source code statement. The method 400 loops between steps 420 and 422 until all of the nodes have been processed. For example, as illustrated in FIG. 3, the expression tree is transformed into an output source code 306 having individual source code statements where each source code statement includes the method append and one argument appended to the object string. For example, one of the individual source code statements 306 of FIG. 3 string.append(stvar_a)

includes the append method where the argument stvar_a is appended to the object string. When all of the nodes have been processed, the method 400 proceeds to step 426. At step 426, the method 400 determines if there are more constructs to parse. If there are more constructs to parse, the method 400 proceeds to step 404. If there are no more constructs to parse, the method 400 exits at step 428. Subsequently, the transformed source code (e.g., output source code 306) is compiled by the optimizing compiler program 119 into executable code or bytecode depending on the software environment. Accordingly, when the transformed source code is executed on a processor such as the processor 102 of FIG. 1, temporary objects are not required, as the source code has been transformed into a plurality of single source code statements having one argument.

While the foregoing is directed to embodiments of the present invention, other and further embodiments of the invention may be devised without departing from the basic scope thereof, and the scope thereof is determined by the claims that follow.

What is claimed is:

1. A method of transforming source code, comprising:
   determining if a source code statement includes a first operation, comprising a method call, that receives input from a result of a second operation wherein the second operation arts on a plurality of arguments, and wherein the second operation includes at least one concatenation operator;
   if the source code statement includes the first operation, then transforming the source code statement into a plurality of source code statements, wherein the transforming comprises:
   generating an expression tree representing the second operation acting on the plurality of arguments: and
   transforming the first operation and arguments of the second operation into the plurality of source code statements, wherein each of the plurality of source code statements contains the first operation acting on a different one of the plurality of arguments.

2. The method of claim 1, further comprising, generating, for a concatenation operation, at least one new method call using an object and a method of the new method call.

3. The method of claim 1, further comprising, generating at least one new method call using the concatenation operator as the argument.

4. The method of claim 2, wherein the new method call includes an append method.

5. The method of claim 2, wherein the new method call includes an object of type string.

6. A method of transforming source code, comprising:
   parsing a source code statement, wherein the source code statement comprises a method call;
   determining if the source code statement includes a first operation that receives as input a result of a second operation, wherein the second operation acts on a plurality of arguments and includes at least one concatenation operator;
   and if so, determining an order of the arguments;
   generating an expression tree based on the order, that represents the second operation acting on the plurality of arguments; and
   transforming the source code statements into a plurality of source code statements, wherein each of the plurality of source code statements contains the first operation acting on one of the plurality of arguments.

7. The method of claim 6, further comprising compiling the plurality of statements.

8. The method of claim 6, further comprising, generating at least one new method call using at least one object and the method call of the source code statement.

9. The method of claim 8, wherein, if the source code statement includes the method call then generating at least one source code statement, included in the plurality of source code statements, that passes one concatenation operator into the argument of the method call.

10. A computer readable medium storing software program that, when executed by a processor of a computer, causes the computer to perform an operation comprising;
    determining if a source code statement includes a first operation comprising a method call, that receives as input a result of a second operation wherein the second operation acts on a plurality of arguments, and wherein the second operation includes at least one concatenation operator; and
    if the source code statement includes the first operation, then transforming the source code statement into a plurality of source code statements, wherein the transforming comprises:
    generating an expression tree representing the second operation acting on the plurality of arguments; and
    transforming the first operation and arguments of the second operation into the plurality of source code statements, wherein each source code statement contains the first operation acting on one of the arguments.

11. The computer readable medium of claim 10, further comprising, generating at least one new method call using an object and the method of the first method call.

12. The computer readable medium of claim 10, further comprising, generating at least one new method call using the concatenation operator as the argument.

13. The method of claim 1, wherein transforming the first operation and arguments of the second operation into the plurality of source code statements comprises, traversing the expression tree, and for each node of the expression tree that stores at least one of the plurality of arguments, generating a source code statement that includes the method call of the first operation, wherein each argument associated with the node is passed to the method call.

14. The method of claim 6, wherein transforming the source code statements into a plurality of source code statements comprises, traversing the expression tree, and for each node of the expression tree that stores at least one of the plurality of arguments, generating a source code statement that includes the method call of the first operation, wherein each argument associated with the node is passed to the method call.

15. The computer-readable medium of claim 10, wherein transforming the first operation and arguments of the second operation into the plurality of source code statements comprises, traversing the expression tree, and for each node of the expression tree that stores at least one of the plurality of arguments, generating a source code statement that includes the method call of the first operation, wherein each argument associated with the node is passed to the method call.

* * * * *